(12) United States Patent
DiSpazio

(10) Patent No.: US 12,459,704 B1
(45) Date of Patent: *Nov. 4, 2025

(54) WASTE BAG AND ASSEMBLY METHODS

(71) Applicant: DICO HOLDINGS LLC, Delray Beach, FL (US)

(72) Inventor: Paul G. DiSpazio, Delray Beach, FL (US)

(73) Assignee: DICO HOLDINGS LLC, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,972

(22) Filed: Sep. 21, 2022

Related U.S. Application Data

(63) Continuation of application No. 16/653,097, filed on Oct. 15, 2019, now abandoned, which is a continuation of application No. 14/141,267, filed on Dec. 26, 2013, now Pat. No. 10,442,575.

(60) Provisional application No. 61/759,734, filed on Feb. 1, 2013, provisional application No. 61/750,747, filed on Jan. 9, 2013, provisional application No. 61/745,938, filed on Dec. 26, 2012.

(51) Int. Cl.
| | |
|---|---|
| *B65D 33/02* | (2006.01) |
| *B65D 6/24* | (2006.01) |
| *B65D 6/34* | (2006.01) |
| *B65D 90/20* | (2006.01) |
| *B65F 1/14* | (2006.01) |

(52) U.S. Cl.
CPC .......... *B65D 33/02* (2013.01); *B65D 11/1866* (2013.01); *B65D 11/22* (2013.01); *B65D 90/20* (2013.01); *B65D 90/205* (2013.01); *B65F 1/141* (2013.01); *B65F 1/1415* (2013.01); *B65F 2240/118* (2013.01)

(58) Field of Classification Search
CPC .. B65D 33/02; B65D 11/1866; B65D 90/205; B65D 37/00; B65D 52/00; B65F 1/141; B65F 1/1415; B65F 2240/118; B65B 67/1205; B65B 67/12
USPC ................................................... 220/9.1–9.4
See application file for complete search history.

(56) References Cited

U.S. PATENT DOCUMENTS

| | | | | |
|---|---|---|---|---|
| 3,367,487 A | * | 2/1968 | Dwyer, Jr. ........... | B65D 5/5445 229/122 |
| 4,290,525 A | * | 9/1981 | Sisson .................... | B65D 33/06 206/427 |

(Continued)

FOREIGN PATENT DOCUMENTS

| | | | |
|---|---|---|---|
| EP | 0300622 A1 | * | 1/1989 |
| JP | 2001240186 A | | 9/2001 |

(Continued)

OTHER PUBLICATIONS

US Office Action dated Sep. 10, 2014 for U.S. Appl. No. 14/151,338.

(Continued)

*Primary Examiner* — Nathan J Newhouse
*Assistant Examiner* — Nina K Attel
(74) *Attorney, Agent, or Firm* — Bachman & LaPointe, P.C.

(57) ABSTRACT

A dumpster bag has: a flexible bag member including a bottom and a sidewall structure extending upward from the bottom to a rim; at least one rim stay comprising a bungee pole; and at least one corner stay.

20 Claims, 3 Drawing Sheets

(56) References Cited

U.S. PATENT DOCUMENTS

| | | | |
|---|---|---|---|
| 4,307,764 A | 12/1981 | Nattrass | |
| 4,678,093 A * | 7/1987 | Allen | A61J 9/00 |
| | | | 200/DIG. 18 |
| 4,979,531 A | 12/1990 | Toor et al. | |
| 5,108,196 A | 4/1992 | Hughes | |
| 5,465,865 A * | 11/1995 | Coombes | B65D 21/0209 |
| | | | 220/601 |
| 5,494,066 A | 2/1996 | McMahan | |
| 5,695,286 A | 12/1997 | Williamson et al. | |
| 5,927,311 A | 7/1999 | Jager | |
| 6,102,569 A | 8/2000 | Wang | |
| 6,328,082 B1 * | 12/2001 | Lafond | A61M 1/062 |
| | | | 215/11.6 |
| 6,367,747 B1 * | 4/2002 | Mulle | B65D 33/007 |
| | | | 383/33 |
| 6,739,753 B2 | 5/2004 | Richardson, Jr. et al. | |
| 6,952,844 B2 | 10/2005 | Danaher | |
| 7,427,160 B2 | 9/2008 | Richardson, Jr. et al. | |
| 7,500,786 B2 | 3/2009 | Richardson, Jr. et al. | |
| 7,753,003 B2 | 7/2010 | Farmer et al. | |
| 7,861,880 B2 | 1/2011 | Britt et al. | |
| 8,100,280 B1 * | 1/2012 | Hernandez | D06F 95/002 |
| | | | 220/9.4 |
| 2001/0000464 A1 | 4/2001 | Beale | |
| 2002/0033199 A1 | 3/2002 | Lafond | |
| 2004/0151404 A1 | 8/2004 | Richardson, Jr. et al. | |
| 2006/0110074 A1 | 5/2006 | Richardson, Jr. et al. | |
| 2006/0189957 A1 * | 8/2006 | Howlett | A61F 5/451 |
| | | | 604/403 |
| 2009/0001089 A1 * | 1/2009 | Britt | B65D 88/1668 |
| | | | 220/666 |
| 2011/0192750 A1 * | 8/2011 | Kokin | B65D 1/265 |
| | | | 206/459.1 |
| 2012/0103981 A1 * | 5/2012 | Warren | B65F 1/1415 |
| | | | 53/457 |
| 2012/0193354 A1 * | 8/2012 | Cavenagh | B65D 88/1612 |
| | | | 220/9.3 |

FOREIGN PATENT DOCUMENTS

| | | |
|---|---|---|
| JP | 2002145390 A | 5/2002 |
| WO | 2007108833 A2 | 9/2007 |

OTHER PUBLICATIONS

US Office Action dated Jul. 14, 2015 for U.S. Appl. No. 14/141,267.
US Office Action dated Jan. 20, 2016 for U.S. Appl. No. 14/141,267.
US Office Action dated Jul. 19, 2016 for U.S. Appl. No. 14/141,267.
US Office Action dated Feb. 10, 2017 for U.S. Appl. No. 14/141,267.
US Office Action dated Feb. 14, 2020 for U.S. Appl. No. 16/653,097.
US Office Action dated Sep. 16, 2020 for U.S. Appl. No. 16/653,097.
US Office Action dated Aug. 4, 2021 for U.S. Appl. No. 16/653,097.
US Office Action dated Mar. 21, 2022 for U.S. Appl. No. 16/653,097.

* cited by examiner

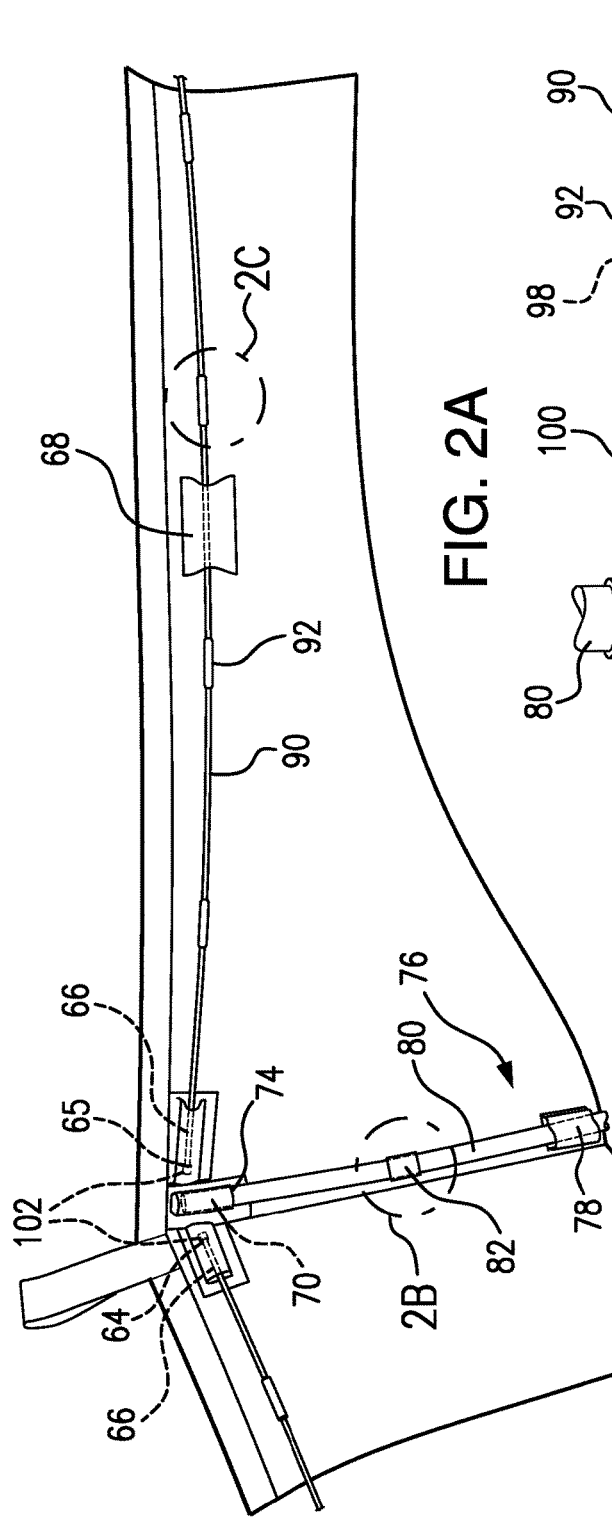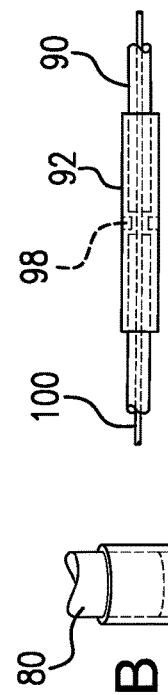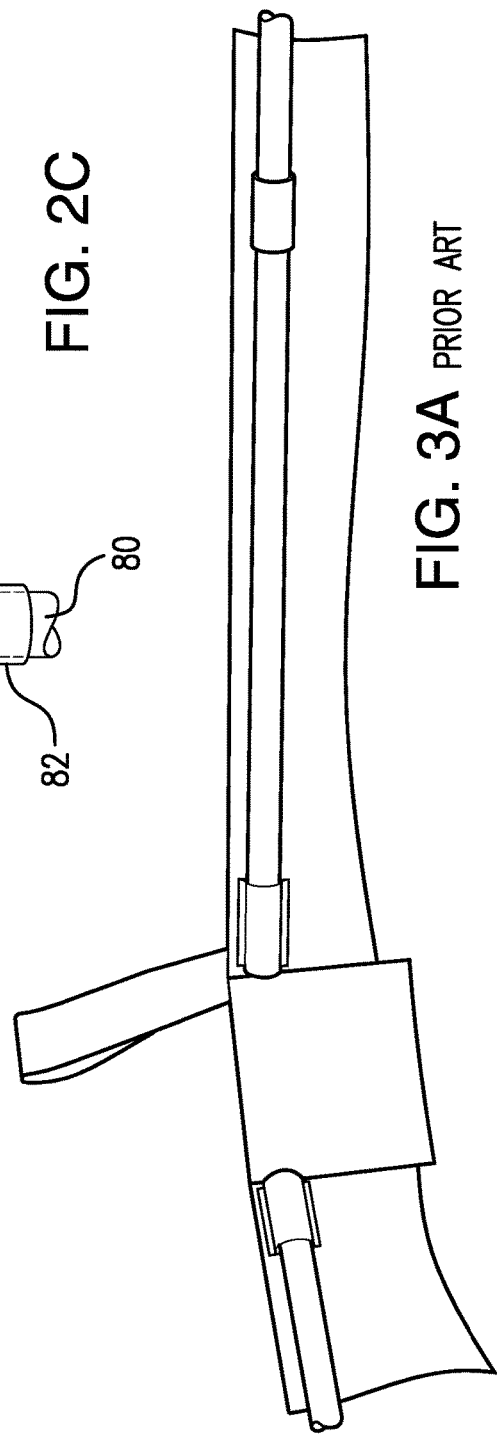

WASTE BAG AND ASSEMBLY METHODS

CROSS-REFERENCE TO RELATED APPLICATIONS

This is a continuation application of U.S. patent application Ser. No. 14/141,267, filed Dec. 26, 2013, and entitled "Waste Bag and Assembly Methods", which claims benefit of U.S. Patent Application No. 61/745,938, filed Dec. 26, 2012, and entitled "Waste Bag and Assembly Methods", U.S. Patent Application No. 61/750,747, filed Jan. 9, 2013, and entitled "Waste Bag Use Methods", and U.S. Patent Application No. 61/759,734, filed Feb. 1, 2013, and entitled "Waste Bag Use Methods and Apparatus" the disclosures of which are incorporated by reference herein in their entirety as if set forth at length.

BACKGROUND OF THE INVENTION

The disclosure relates to large waste bags or dumpster bags.

Several forms of dumpster bags have been sold commercially. One example is in International Application No. WO2007/108833A2, entitled "Bulk Material Handling System and Apparatus, published Sep. 27, 2007, the disclosure of which is incorporated by reference herein in its entirety as if set forth at length. An example of such a bag is seen in FIG. 3. As is discussed below, to hold its open form, this bag includes PVC pipe rim stays and sewn-in corner stay panels.

SUMMARY OF THE INVENTION

According to one aspect of the disclosure, a dumpster bag has: a flexible bag member including a bottom and a sidewall structure extending upward from the bottom to a rim; at least one rim stay comprising a bungee pole; and at least one corner stay.

A further embodiment may additionally and/or alternatively include there being four said rim stays and four said corner stays.

A further embodiment may additionally and/or alternatively include the corner stays comprising plastic-pipe assemblies.

A further embodiment may additionally and/or alternatively include the corner stays each comprising a plurality of composite tubular segments and a plurality of ferrules for connecting adjacent segments.

A further embodiment may additionally and/or alternatively include the rim stays being under compression, placing adjacent material of the bag under tension across the length of the rim stays.

A further embodiment may additionally and/or alternatively include the bag comprising polyethylene and polypropylene fiber A further embodiment may additionally and/or alternatively include the bag having a height of 1-2 meters, a width of 1-4 meters, and a depth of 1-3 meters.

A further embodiment may additionally and/or alternatively include the bag having loops at each of four upper corners and four lower corners.

A further embodiment may additionally and/or alternatively include the bungee poles comprising segments of less than 10 millimeter in diameter.

Another aspect of the disclosure involves a dumpster bag comprising: a flexible bag member including a bottom and a sidewall structure extending upward from the bottom to a rim; at least one rim stay; and at least one removable corner stay.

A further embodiment may additionally and/or alternatively include the removable corner stay comprising a plastic pole assembly.

Another aspect of the disclosure involves a dumpster bag comprising: a flexible bag member including a bottom and a sidewall structure extending upward from the bottom to a rim; and an interior and/or exterior of the bag member bearing fill level indicia.

A further embodiment may additionally and/or alternatively include loops at each of four upper corners and four lower corners.

A further embodiment may additionally and/or alternatively include there being at least said indicia for two different fill levels.

A further embodiment may additionally and/or alternatively include there being said indicia for two-four different fill levels.

A further embodiment may additionally and/or alternatively include the indicia comprising lines and/or arrows; and numbers associated with the lines and/or arrows.

A further embodiment may additionally and/or alternatively include the indicia being painted or dyed.

A further embodiment may additionally and/or alternatively include the bag having a capacity of at least 4 cubic yards.

A further embodiment may additionally and/or alternatively include the bag material comprising a fabric.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2A is an enlarged interior corner view of the bag of FIG. 2.

FIG. 2B is an enlarged view of a corner stay joint of the bag of FIG. 2.

FIG. 2C is an enlarged view of a rim stay joint of the bag of FIG. 2.

FIG. 3A is an enlarged interior view of the bag of FIG. 3.

Like reference numbers and designations in the various drawings indicate like elements.

DETAILED DESCRIPTION

Figure 1:
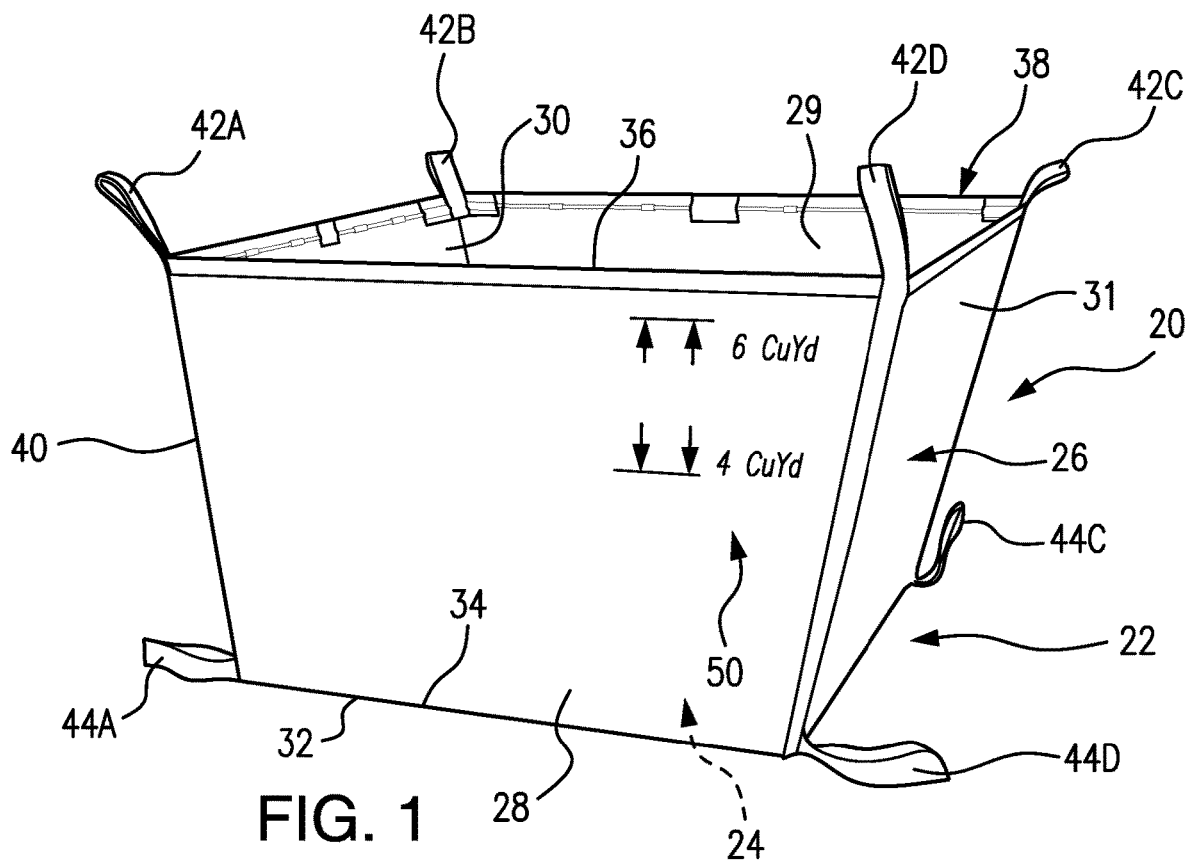
FIG. 1 is a view of an open top, generally right parallelepiped, dumpster bag having carry straps at all four upper corners and dump straps at all four lower corners.

FIG. 1 shows a dumpster bag 20. The bag is generally characterized by a polymer fabric (e.g., a polyethylene/polypropylene hybrid) body 22 having a generally rectangular planform with a rectangular base or bottom 24 and a sidewall structure 26 circumscribing the base or bottom and comprising four respective generally rectangular sidewalls 28, 29, 30, 31. The sidewalls each extend from a lower edge 32 at a corresponding peripheral edge 34 of the base to an upper edge 36 forming a rim 38 of the bag. Adjacent sidewalls meet at a junction or corner 40. Straps/loops (e.g., 42A, 42B, 42C, 42D, 44A, 44B, 44C, 44D for lifting, dumping, tie-down or the like), gussets and other reinforcements, and other features may be of the type generally found in prior art bags or yet developed.

An exemplary nominal 6 cubic yard bag is 77"W×77"L× 45"H. The interior and/or exterior may bear fill level indicia 50 (e.g., lines and/or arrows and numbers (e.g., 2 cubic yards and 4 cubic yards in addition to a 6 cubic yard maximum)), allowing one bag size to be used in lieu of a series of sizes.

To hold the bag upright and open, in an assembled condition the bag includes stays (corner stays) 60 (FIG. 2) extending generally vertically along the corner junctions and stays (rim stays) 62 extending generally horizontally adjacent the upper edges of the four sidewalls. The exemplary corner stays are polymeric tube assemblies (e.g., PVC tube). Depending upon bag size, an exemplary corner stay may have a height of between about 0.5 and 2.0 meter (more particularly, 0.7-1.5 meter) and generally nearly bag height.

Figure 2:
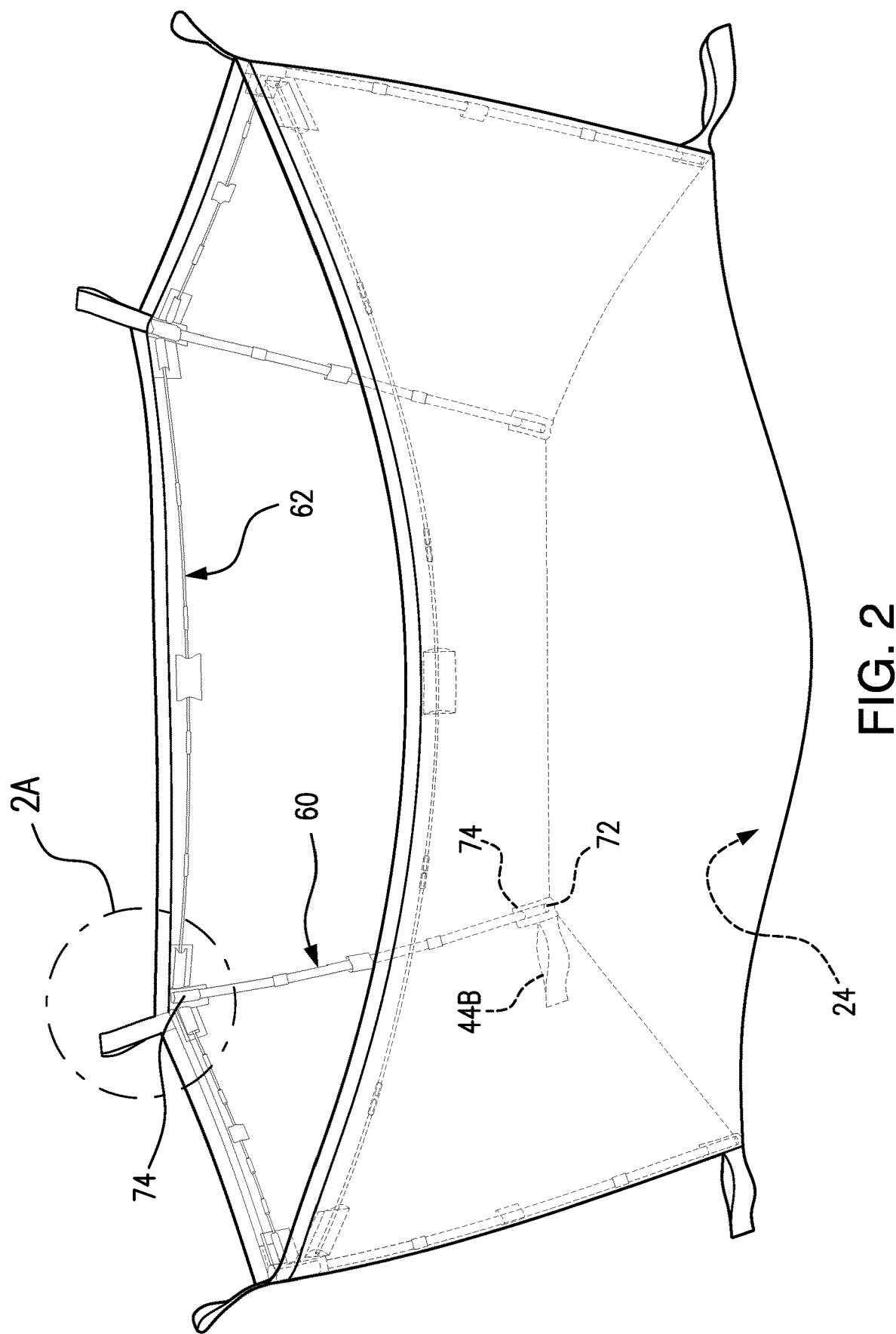
FIG. 2 is an interior view of an upper rim portion of the bag showing full width of one of the four sidewalls.

FIG. 2 shows each rim stay 62 secured on the interior near the rim 38 of the bag with ends 64, 65 of the rim stay received in sewn-in fabric pockets 66 near the corners adjoining the adjacent walls, an intermediate portion of the rim stay passing through a sewn-in loop 68 (e.g., woven strapping or a similar material to the main portion of the bag) to secure it in place. The corner stays 60 are also shown extending vertically along junctions 40 between the adjacent side panels and similarly between upper and lower end portions 70, 72 accommodated in opposed pockets 74 and an intermediate portion 76 passing through a loop 78.

Figure 3:
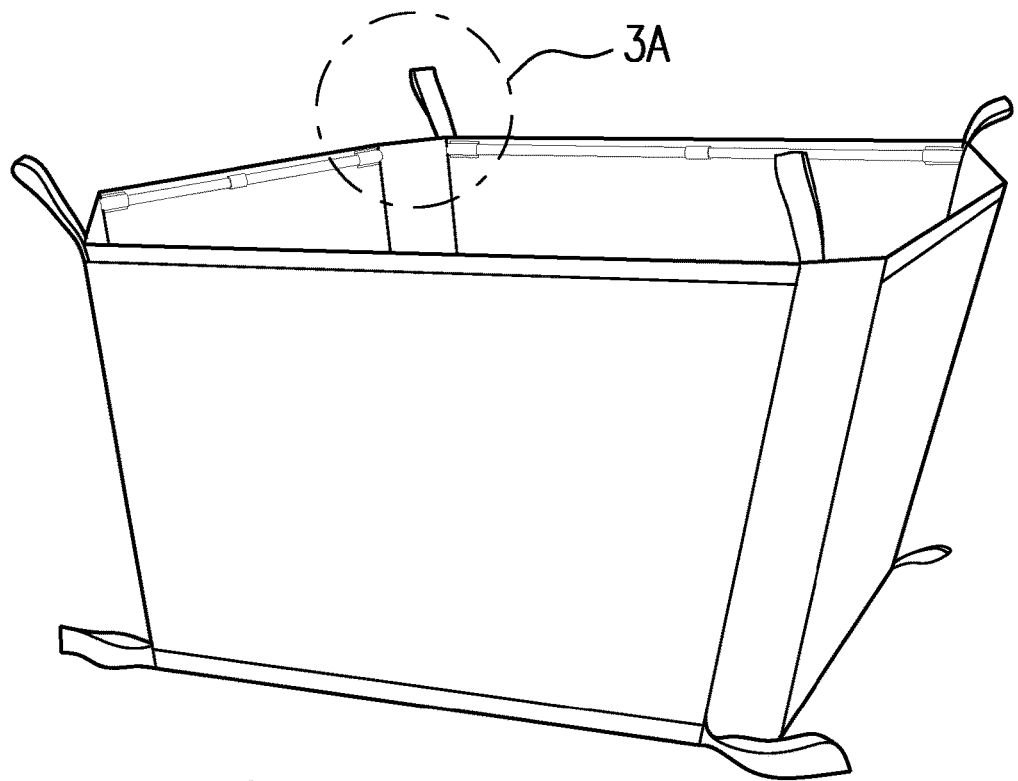
FIG. 3 is a view of a prior art bag comprising sewn-in corner panels and removable pipe rim stays.

If the bag is to be shipped or stored in a folded condition along with the stays, the planform dimensions of the folded bag may be less than the length of the corner says. Accordingly, the exemplary corner stays may be broken down into shorter lengths. In a simple example, this is done by forming each of the corner stays as a plurality of segments of plastic pipe 80 which may be assembled end-to-end. For example, it may be formed in an exemplary two-four segments, more particularly, three. For each segment-to-segment joint, one of the segments may be pre-fitted with an end collar 82 dimensioned to receive the mating end of the next segment. The collar 82 may be a standard pipe fitting or merely a larger pipe whose inner diameter (ID) is sufficient to accommodate the outer diameter (OD) of the segments 80. The collar may be secured to its associated segment by solvent or adhesive bonding or other means. These are similar to the rim stays of the FIG. 3 prior art bag.

For the rim stays 62, it is similarly desirable that they be shortenable for storage and transport. Exemplary rim stays are in the 1.0-4.0 or 1.0-3.0 meter range when assembled, more particularly, 1.5-2.5 meter (and generally about a couple of inches shorter than the associated wall dimension to provide room for the corner stays. The exemplary rim stays are formed by bungee pole (shock pole) assemblies as are used in some tents. Each such bungee pole assembly comprises a series of tubular segments 90 which may be secured end-to-end via fittings 92. For example, exemplary tubular segments are formed of fiberglass or other composite and, for each joint between segments, a tubular metallic fitting (ferrule) 92 is secured to one of the associated segments (e.g., via adhesive or crimping or via a central crimp 98 to hold the ferrule at the junction) to, in turn, receive the associated end of the other associated segment. An elastic member (shock cord) 100 extends through the fitting to draw the two segments together. In one example, a single elastic member extends the entire rim stay length and terminal ends of the terminal segments are covered with resilient elastomeric (e.g., rubber or plastic) caps 102 to avoid cutting the pocket receiving them. Each exemplary rim stay is formed in five segments (more broadly, 3-8 or 4-6). Exemplary tubular segment 90 outer diameter (OD) is less than 1 cm (e.g., nominal 0.25 inch outer diameter or, more broadly, 5-9 mm). From the assembled condition, the bungee pole stays may be extended at the joints to separate one segment end from the adjacent ferrule 92 whereupon it may be folded at the exposed cord. Assembly may be via the reverse, simply straightening and then letting the cord tension seat the segments in the ferrules.

Use of bungee poles for rim stays may have one or more of several advantages relative to using PVC tube assemblies. Greater physical flexibility of the bungee stays may account for several possible advantages. One such advantage is increased robustness. Another possible advantage is that the ability to flex the stay during installation allows the stay to be installed under compression (e.g., flexed in order to engage end pockets). This may allow such bungee stays to better hold the bag fully open than would other stays. Other advantages are that the bungee stays will be even more compact than pipe stays for shipping.

Manufacture may be via conventional fabric cutting and sewing techniques. Use may be via conventional filling and lifting via the loops. At least the rim stays may be removed after filling but before lifting.

One or more embodiments of the present invention have been described. Nevertheless, it will be understood that various modifications may be made without departing from the spirit and scope of the invention. For example, when implemented in the redesign of an existing bag, details of the existing bag may influence details of any particular implementation. Accordingly, other embodiments are within the scope of the following claims.

What is claimed is:

1. A dumpster bag comprising:
   a flexible bag member including a bottom and a sidewall structure extending upward from the bottom to a rim and having four corners;
   four rim stays each comprising a bungee pole having a first end in a first pocket along the rim at a first said corner and a second end in a second pocket along the rim at a second said corner and passing through a loop along the rim between the first pocket and the second pocket; and
   four corner stays respectively along the four corners.

2. The bag of claim 1 wherein the bag has:
   loops at each of four upper corners and four lower corners; and
   a height of 1-2 meters, a width of 1-4 meters, and a depth of 1-3 meters.

3. The bag of claim 2 wherein:
   the four corner stays comprise plastic-pipe assemblies.

4. The bag of claim 2 wherein:
   the four corner stays each comprise a plurality of composite tubular segments and a plurality of ferrules for connecting adjacent segments.

5. The bag of claim 1 wherein:
   the four rim stays are under compression, placing adjacent material of the bag under tension across the length of the rim stays.

6. The bag of claim 1 wherein:
   the bag comprises polyethylene and polypropylene fiber.

7. The bag of claim 1 having:
   a height of 1-2 meters, a width of 1-4 meters, and a depth of 1-3 meters.

8. The bag of claim 1 having:
loops at each of four upper corners and four lower corners.

9. The bag of claim 1 wherein:
the bungee poles comprise segments of less than 10 millimeter in diameter.

10. A dumpster bag comprising:
a flexible bag member including a bottom and a sidewall structure extending upward from the bottom to a rim, the flexible bag member having four lower corners and four upper corners;
four corner stays each extending within an interior respectively vertically between a respective associated one of the lower corners and a respective associated one of the upper corners, the four corner stays each comprising a plastic pipe assembly comprising a plurality of pipe segments joined by collars, each collar solvent or adhesive bonded to one of its two joined segments; and
four rim stays each extending horizontally along a respective side of the bag between two adjacent ones of the upper corners and each having a first end in a first pocket along the rim at a first said adjacent upper corner and a second end in a second pocket along the rim at a second said adjacent upper corner and passing through a loop along the rim between the first pocket and the second pocket.

11. The bag of claim 10 wherein:
the bag comprises polyethylene and polypropylene fiber; and
the bag has:
  loops at each of four upper corners and four lower corners; and
  a height of 1-2 meters, a width of 1-4 meters, and a depth of 1-3 meters.

12. A dumpster bag comprising:
a flexible bag member including a bottom and a sidewall structure extending upward from the bottom to a rim and having four corners;
four rim stays each extending between two adjacent corners of the four corners, having a first end in a first pocket along the rim at a first of said two adjacent corners and a second end in a second pocket along the rim at a second of said two adjacent corners, and passing through a loop along the rim between the first pocket and the second pocket;
four corner stays respectively along the four corners; and
an interior and/or exterior of the bag member bearing fill level indicia.

13. The bag of claim 12 further comprising:
loops at each of four upper corners and four lower corners.

14. The bag of claim 12 wherein:
there are at least said indicia for two different fill levels.

15. The bag of claim 12 wherein:
there are said indicia for two-four different fill levels.

16. The bag of claim 12 wherein:
the indicia comprise:
  lines and/or arrows; and
  numbers associated with the lines and/or arrows.

17. The bag of claim 12 wherein:
the indicia are painted or dyed.

18. The bag of claim 12 having a capacity of at least 4 cubic yards.

19. The bag of claim 12 wherein the bag material comprises a fabric.

20. The bag of claim 12 wherein:
the four corner stays each pass through a respective loop along the respective associated corner.

* * * * *